United States Patent [19]
Colgate et al.

[11] Patent Number: 5,923,139
[45] Date of Patent: Jul. 13, 1999

[54] PASSIVE ROBOTIC CONSTRAINT DEVICES USING NON-HOLONOMIC TRANSMISSION ELEMENTS

[75] Inventors: James E. Colgate, Evanston; Michael A. Peshkin, Skokie, both of Ill.

[73] Assignee: Northwestern University, Evanston, Ill.

[21] Appl. No.: 08/605,997

[22] Filed: Feb. 23, 1996

[51] Int. Cl.[6] .................................................. G05B 11/01
[52] U.S. Cl. .................... 318/566; 318/568.11; 318/628; 395/95; 74/490.03; 74/490.07; 74/490.11
[58] Field of Search .................................. 395/90, 95, 96; 318/560, 563, 565, 566–568.25, 587, 628; 74/490.01, 490.03, 490.07–491

[56] References Cited

U.S. PATENT DOCUMENTS

| | | |
|---|---|---|
| 572,832 | 12/1896 | Samond . |
| 1,256,234 | 2/1918 | Innes . |
| 2,139,635 | 12/1938 | House . |
| 2,477,527 | 7/1949 | Pierce . |
| 2,586,421 | 2/1952 | Evers . |
| 2,727,396 | 12/1955 | Haugwitz . |
| 5,116,180 | 5/1992 | Fang et al. . |
| 5,300,869 | 4/1994 | Skaar et al. ............................ 318/587 |
| 5,374,879 | 12/1994 | Pin et al. ................................ 318/139 |
| 5,389,865 | 2/1995 | Jacobus et al. . |
| 5,397,323 | 3/1995 | Taylor et al. . |
| 5,399,951 | 3/1995 | Lavallee et al. . |
| 5,459,382 | 10/1995 | Jacobus et al. . |
| 5,467,084 | 11/1995 | Alofs et al. ............................. 340/933 |
| 5,487,437 | 1/1996 | Avitan ..................................... 180/6.5 |
| 5,576,727 | 11/1996 | Rosenberg et al. . |
| 5,587,937 | 12/1996 | Massie et al. . |
| 5,625,576 | 4/1997 | Massie et al. ........................... 364/578 |

OTHER PUBLICATIONS

Controlling Dissipative Magnetic Particle Brakes in Force Reflective Devices, Russo and Tadros, ASME Winter Annual Meeting, pp. 63–70, 1992.

The Use of Virtual Fixtures to Enhance Telemanipulation with Time Delay, Rosenberg DSC—vol. 49, Advances in Robotics Mechatronics, and Haptic Interfaces, ASME 1993.

PADyC: a Passive Arm with Dynamic Constraints, a Prototype with Two Degrees of Freedom, Demondedien et al., Medical Robotics and Computer Assisted Surgery, Nov., 1995.

Mechanisms & Mechanical Devices Sourcebook, Nicholas P. Chironis, editor McGraw Hill, 1991, pp. 244 and 255.

Book et al., The Concept and Implementation of a Passive Trajectory Enhancing Robot, DSC–vol. 58, Proceedings of the ASME Dynamics Systems and Control Division, 1996, pp. 633–638.

Peshkin et al., Passive Robots and Haptic Displays Based on Nonholonomic Elements, Proceedings of the 1996 IEEE International Conference on Robotics and Automation, Minneapolis, Minnesota, Apr. 1996, pp. 551–556.

(List continued on next page.)

*Primary Examiner*—Brian Sircus
*Attorney, Agent, or Firm*—McDonnell, Boehnen, Hulbert & Berghoff

[57] ABSTRACT

A passive constraint device for implementing a programmable virtual constraint surface, comprises one or more non-holonomic kinematic transmission element for coupling velocities of motion and having a steering angle. A user moves the handle of the passive constraint device relative to the virtual surface. A steering motor sets the steering angle of the non-holonomic element in response to the proximity of the handle to the virtual surface. When in contact with the virtual surface, the steering angle is set so as to prohibit any motion which would penetrate the surface. When not in contact with the virtual surface, the steering motor adjusts the steering angle in response to the user's applied forces, to provide apparent freedom of motion to the user.

25 Claims, 8 Drawing Sheets

OTHER PUBLICATIONS

Colgate et al., Nonholonomic Haptic Display, Proceedings of the 1996 IEEE International Conference on Robotics and Automation, Minneapolis, Minnesota, Apr. 1996, pp. 539–544.

Colgate et al., Cobots: Robots for Collaboration With Human Operators, Proceedings of the ASME Dynamic Systems and Control Division, DSC–vol. 58, Nov. 1996, Atlanta, GA, pp. 633–638.

Sordalen et al., Design of a Nonholonomic Manipulator, Proceedings of the 1994 IEEE International Conference on Robotics and Automation, pp. 8–13.

Chung et al., Prototyping a Nonholonomic Manipulator, Proceedings of the 1995 IEEE International Conference on Robotics and Automation, Nagoya, Japan, May 21–27, 1995.

Kelley et al., On The Development Of a Force–Feedback Mouse and Its Integration Into a Graphical User Interface, DSC–vol. 55–1, Proceedings of the ASME Dynamics Systems and Control Division, 1994, pp. 287–294.

Massie et al., The Phantom Haptic Interface: A Device for Probing Virtual Objects, DSC–vol. 55–1, Proceedings of the ASME Dynamics Systems and Control Division, 1994, pp. 295–301.

Salcudean et al., On the Emulation of Stiff Walls and Static Friction With a Magnetically Levitated Input/Output Device, DSC–vol. 55–1, Proceedings of the ASME Dynamics Systems and Control Division, 1994, pp. 303–309.

Gillespie et al., Stable Use–Specific Haptic Rendering of the Virtual Wall, DSC–vol. 58, Proceedings of the ASME Dynamics Systems and Control Division, 1996, pp. 397–406.

Ellis et al., Design and Evaluation of a High–Performance Prototype Planar Haptic Interface, DSC–vol. 49, Proceedings of the ASME Dynamics Systems and Control Division, 1993, pp. 56–64.

Kazerooni, The Human Power Amplifier Technology at the University of California, Berkeley, DSC–vol. 57–2, 1995 IMECE Proceedings of the ASME Dynamic Systems and Control Division, ASME 1995.

Rosenberg, The Use of Virtual Fixtures to Enhance Telemanipulation With Time Delay, DSC–vol. 49, Proceedings of the ASME Advances in Robotics, Mechatronics, and Haptic Interfaces, 1993, pp. 29–36.

Dvorak, Your Guide to Variable–Speed Mechanical Drives, pp. 244–255, Mechanisms and Mechanical Devices Sourcebook, Nicholas P. Chironis, Ed., McGraw Hill, 1991.

Ollero et al., Stability Analysis of Mobile Robot Path Tracking, IEEE/RSJ Int'l Conference on Intelligent Robots and Systems (IROS), Pittsburgh, PA, vol. 3, 1995.

PASSIVE ROBOTIC CONSTRAINT DEVICES USING NON-HOLONOMIC TRANSMISSION ELEMENTS

FIELD OF THE INVENTION

The present invention relates to passive robotic constraint devices for interaction with human operators, and for implementation of computer programmable constraints.

BACKGROUND OF THE INVENTION

Several recent areas of interest in robotics require the direct physical interaction of an operator with manipulators, haptic displays, or assistive devices. Haptic displays, which are essentially robots designed for direct, physical interaction with human operators, have a great variety of applications. These applications can range from teleoperation, to virtual reality, to robotic surgery.

Haptic displays can be used to implement programmable constraint where, for example, haptic virtual fixtures (i.e. hard walls which constrain motion to useful directions) can improve performance in teleoperation tasks such as a remote peg-in-hole insertion task. Further, in computer-assisted surgery, a surgeon may move a surgical tool cooperatively with a robot, with the robot enforcing certain constraints (e.g. "cut only this surface") while the surgeon is free to maneuver the tool within the allowed surface. In virtual reality applications, a user may interact with and "feel" objects which exist only in digital representation, by using a haptic display to probe those virtual objects and perceive the resulting reaction forces. In vehicle final assembly, workers may cooperatively control the motion of large, heavy vehicle components with an assistive device, where the assistive device controls some aspects or bounds on its motion, while the worker controls others.

The aforementioned examples have in common the exchange of force and motion between a human and a multi-degrees of freedom robot. For example, the examples involve the commonalities of constraining the motion of a human operator and the human operator supplying the source of energy for carrying out the particular task. Different requirements apply to robots such as these, that interact energetically with an operator, than apply to industrial robots in a typical humans-excluded environment. First, the development of perceptually smooth force-following, in which the robot is guided by the user, has been found to be quite difficult and to require much higher servo rates than are needed for position control alone. Second, passivity and stability of the robotic system is required when it is considered that a robot with a payload of only a few pounds can quickly develop lethal kinetic energy and when unpredictable human impedance is possible during operation.

Conventional passive haptic constraint devices typically have been provided with as many degrees of freedom as the resulting device is expected to exhibit and its joints are driven by motors to this end. If the motors are inactive, the user can move the device freely. When it is desired to reduce the number of degrees of freedom (in order to implement a software constraint surface), the motors are activated to couple the motion of the joints so that the user's ability to move the device is constrained.

However, when using conventional approaches to haptic constraint devices where servo control is used to reduce the degrees of freedom of the robot to those consistent with the programmed constraint, passivity and constraint have been antagonistic goals. In particular, to implement an effective constraint, a servocontroller requires high gains which are incompatible with robotic passivity and stability. Such disadvantages are inherent to the servo controlled approach to haptic displays.

Passive constraint devices have appeal for operating in continuous time and in a perceptually smooth manner in response to forces applied to it by a user. The passive constraint device lacks external energy sources and its kinetic energy is limited to that provided by the user, therefore a hardware or software failure cannot produce high velocities that might injure the user and/or the robot.

One passive haptic constraint device (M. Russo and A. Tadros, Controlling Dissipative Magnetic Particle Brakes in Force Reflective Devices, ASME Winter Annual Meeting, Anaheim, Calif., pp. 63–70, 1992) employs controllable brakes rather than (or in addition to) servoed actuators at the joints of a device. Brakes can implement very hard constraints and are completely passive. However, a braked passive constraint device suffers from a serious disadvantage in that it is limited to the types of virtual surfaces which it can implement. For example, considering a passive constraint device having brakes that activate in the x-axis and y-axis directions with respect to a two-axis Cartesian coordinate, implementation of a 45 degree wall relative to the x and y axes would require a series of step motions that can be perceived by the user and that can result in both the x-axis and y-axis brakes both being activated in a manner that motion becomes impossible along the 45 degree wall.

SUMMARY OF THE INVENTION

The present invention is a passive constraint device for use in implementing a programmable virtual constraint surface, comprising one or more non-holonomic kinematic transmission elements for coupling velocities of motion and having a steering angle. A user moves a handle, joystick or other user manipulator means of the passive constraint device relative to the virtual surface. A steering motor sets the steering angle of the non-holonomic element in response to the proximity of the handle to the virtual surface.

When in contact with the virtual surface, the steering angle is set so as to prohibit any motion which would penetrate the surface. When not in contact with the virtual surface, the steering motor adjusts the steering angle in response to the user's applied forces to provide apparent freedom of motion to the user. Such a constraint device is completely passive and produces perceptually smooth constrained motion.

In an illustrative embodiment of the invention, the device includes one or more continuously variable transmission (CVT) elements, such as steerable wheels or spheres, as the non-holonomic kinematic element(s) that couple translational or angular velocities of motion. In the constrained mode, the CVT elements mechanically constrain motion to follow along the virtual surface such that the user's ability to move the device is constrained in space. On the other hand, the transmission ratios of the CVT elements are freely adjustable by, for example, feedback servocontrolled steering motors in the free mode of operation to increase the apparent number of degrees of freedom of motion (away from constraint surfaces) to comply with the user's desired motions. Constraint devices in accordance with the present invention thus exhibit an intrinsic constraint mode to set the rolling element orientation to follow the virtual surface. The free mode is achieved through active servo control.

A passive constraint device in accordance with an illustrative embodiment of the invention can use at least n-1 CVT elements for an n degree of freedom manipulator or haptic display. CVT-based robotic constraint devices in accordance with the invention can exhibit programmed constraints (constraint mode with hard, smooth constraint surfaces having dimensionality of less than n) or can allow free n degree of motion (free mode) under software control.

DESCRIPTION OF THE INVENTION

Figure 1A:
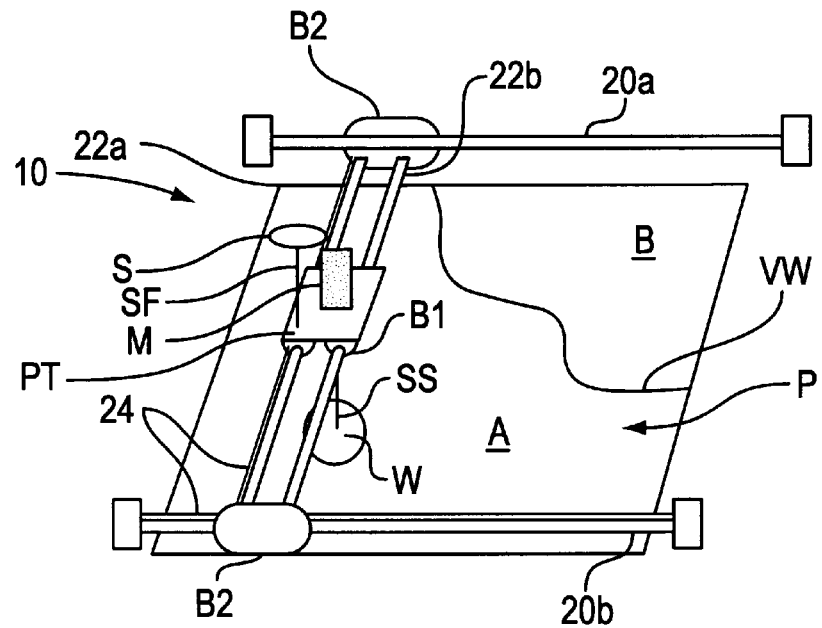
FIG. 1a is a schematic view of a single wheel passive constraint device in accordance with an embodiment of the invention with two (2) degrees of apparent freedom in the free mode and one (1) degree of freedom in the constraint mode.
Figures 1B, 1C:
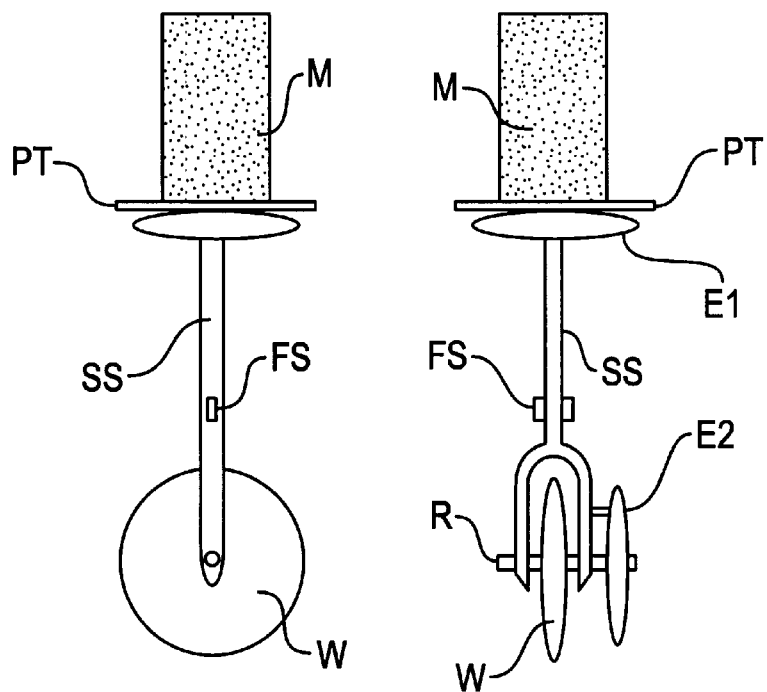
FIGS. 1b and 1c are respective schematic elevational and end views of the wheel/shaft/motor.

Referring to FIG. 1, a passive constraint device 10 in accordance with an embodiment of the invention using a single steerable wheel W as the non-holonomic kinematic CVT element is shown schematically. A non-holonomic kinematic element is one which enforces relationships between velocities, but does not directly constrain positions; examples of such non-holonomic kinematic elements being wheels and continuously variable transmissions (CVT's) described for example hereafter. The single steerable wheel W rolls on a plane P formed by a horizontal surface. In this illustrative embodiment of the invention, the hand of the human user or operator grips the non-rotatable handle S mounted on platform PT via a fixed shaft SF and performs only planar motions in a plane parallel with plane P such that the wheel W is strictly upright (vertical).

The handle S travels the Cartesian x-y rails 20a, 20b; 22a, 22b where the x-y position of the handle is measured by linear potentiometers 24 on suitable x and y rails. To this end, the platform PT includes bushings Bi slidably disposed on the y rails 22a, 22b. The y rails include end bushings B2 that slide on the x rails. The handle S is entirely free to slide on the rails in response to steering force applied by the user. No motors act on the handle or in rolling the wheel W. The rails serve only to constrain the handle to the x-y plane.

A feedback servocontrolled steering motor M is shown schematically disposed on the platform PT to rotate the steering shaft SS via a drive mechanism (not shown) comprising a belt drive or other suitable transmission, so as to steer the wheel W about a vertical axis defined by the longitudinal axis of shaft SS. The motor M can comprise a conventional DC servomotor. The wheel W is caused to roll about its rotational axis R by the user's or operator's moving the non-rotatable handle shaft S in the parallel plane to the plane P. That is, the wheel W is not driven to rotate about axis R. In a typical embodiment, the steering motor M may communicate with the vertical steering shaft SS via a belt drive, gear pair or other transmission mechanism. For simplicity in the figures, the steering motor M is shown in a direct drive configuration, in which the motor M rotates shaft S directly.

An optical encoder E1 is disposed beneath the platform PT proximate to the steering drive mechanism (e.g. to a gear or drive train component that rotates shaft SS) to measure the steering angle of the wheel W. Another optical encoder E2 is disposed on the steering shaft SS to measure the wheel rotation that is used to derive translational velocity, u, discussed below.

The steering shaft 55 includes first and second force sensors FS, a strain gauge, that are disposed on opposite sides of the shaft and that detect steering forces exerted by the user or operator on the shaft perpendicular to the rolling direction of the wheel W as the handle shaft SF is manually moved by the user or operator relative to the virtual wall VW. The wall or surface VW is generated in known manner by a computer model or simulation unit, FIG. 2a, as a surface in the plane F. Alternately, similar force sensors, such as strain gages, can be disposed on the handle shaft SF just below the handle S to measure the planar forces applied by the user.

The passive constraint device of FIG. 1 is operable in two modes of operation; namely, an electronic-caster mode when the handle S is not at the virtual wall VW, and a constrained mode when the handle S is at the virtual wall.

In the electronic-caster mode wheel W emulates a physical caster, being steered by the motor M in such a way that it at all times is oriented such that it can roll in the direction that the handle S is pushed by the user. If the force sensor detects forces perpendicular to the wheel's rolling direction as a result of the user's pushing the handle S, the force sensor sends signals to a control computer, FIG. 2a, that steers wheel W via the motor M and steering shaft SS to minimize these forces. In effect, the wheel W is steered by the motor M so that it can roll in the direction it is pushed by the user or operator. Thus, the user or operator feels that the handle is entirely free to move at will in the region A. The wheel W emulates a caster freely movable in two directions, until such time as the virtual wall or surface VW is encountered.

In the constrained mode of operation when the user moves the wheel W to the edge of the free region A to encounter the wall or surface VW (interface of regions A and B), the computer no longer responds to signals from the force sensor FS. Instead, it sets the steering angle of the wheel W via motor M and steering shaft SS such that its rolling direction is tangential to the virtual wall or surface VW. Thus the user can only move the handle S tangential to the wall, and the handle S appears to have fewer degrees of freedom than it did in the electronic caster mode.

The force sensors FS still monitor user forces perpendicular to the rolling direction of the wheel W. If the forces would tend to push the wheel into the constraint wall or surface VW (i.e. into region B behind the virtual wall VW), they are ignored by the computer control. If the user forces would tend to pull the wheel W off of the constraint wall or surface VW, they are interpreted by the computer control as commands in the free space region A and effected by steering the wheel W so that it can roll back into region A. In this way, it is impossible to push the wheel W past the virtual constraint wall or surface VW, whereas the wheel W can be easily pulled off or moved tangentially relative to the wall or surface VW by the User.

The constraint device of FIG. 1 exhibits two apparent degrees of freedom in the free mode (electronic caster mode) in region A while exhibiting only one degree of freedom in the constrained mode (when in contact with the wall or surface VW) since the CVT wheel element W is set in orientation and mechanically couples the ratio of the x and y velocities at the surface VW so that the wheel can slide only along the wall or surface VW. The user or operator can withdraw the wheel W away from the wall or surface VW to return to the two degrees of apparent freedom in the free mode of operation.

The constraint device is passive in the plane of operation since only steering of the wheel W is controlled by the motor M and steering shaft SS. The force for rotation or rolling of the wheel w is provided by the user or operator via non-rotatable handle S.

Since the motor M exerts torques about an axis that passes through the wheel/ground contact point, it does not generate any reaction forces in the plane of operation.

Figure 2A:
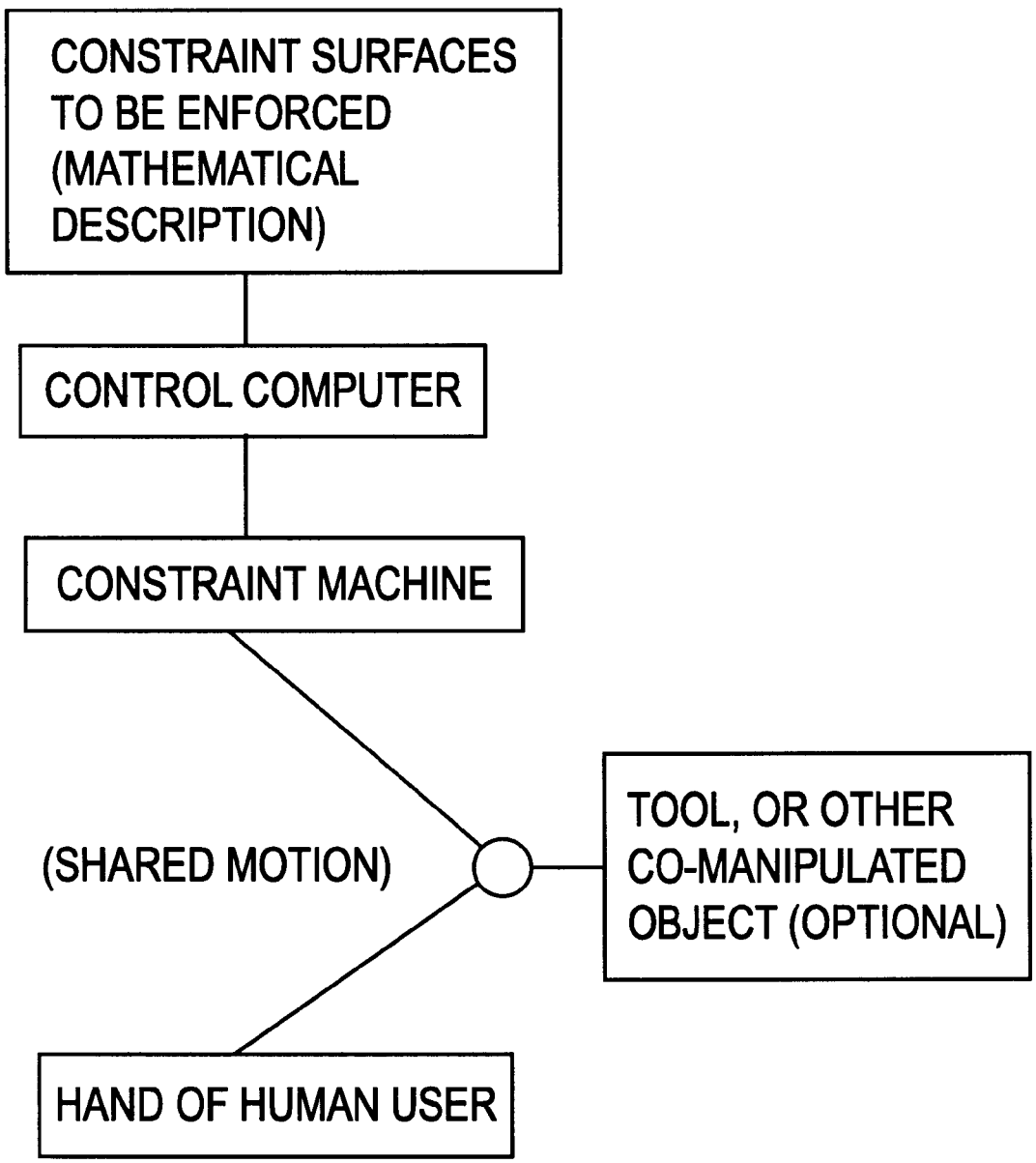
FIG. 2a is a block diagram showing use of a constraint device of the invention with a control computer and virtual surface mathematical model, a manipulated tool or other object, and human user.

FIG. 2a illustrates the relation of the constraint device to the computer model of the desired constraints, and to the control computer that operates the device such as to enforce those constraints. Also illustrated is the way in which the constraint device interacts with a human operator. When used simply as a haptic display, the operator's hand and the device "handle" share a common motion, and thus the constraints are displayed and imposed physically on the operator's hand. When used for cooperative manipulation of a tool (e.g. in robotic surgery) or of a cumbersome workpart (e.g. in vehicle final assembly), there are three parties to the common motion: the manipulated tool or workpart, the operator's hand which supplies the force to move the tool or workpart, and the constraint device which restricts available motions to those that are consistent with the programmed constraints.

Figure 2B:
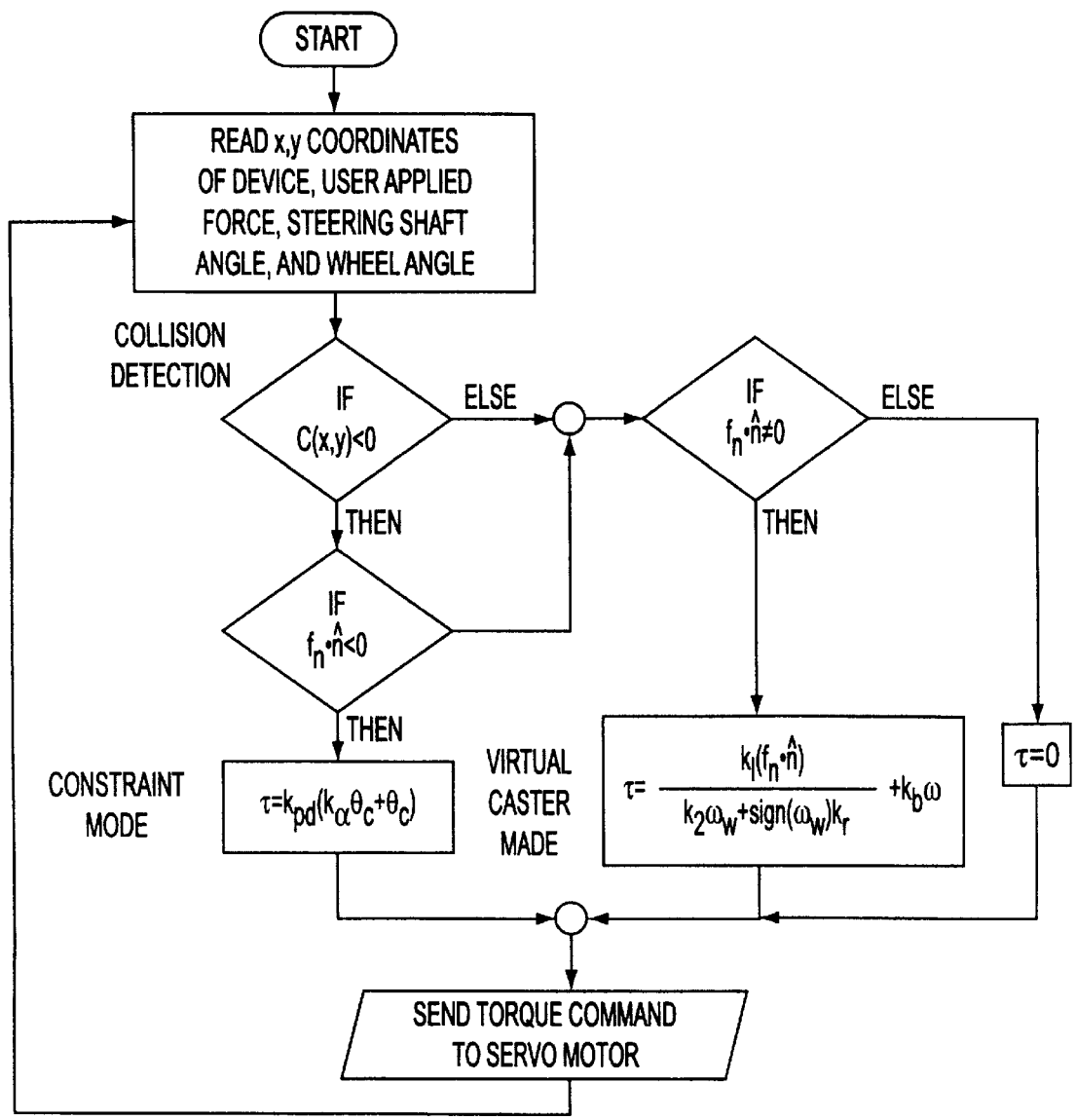
FIG. 2b is a flow chart of the logic and control structure for the constraint device of FIG. 1.

FIG. 2b shows both control logic and the control laws that are used within the control computer to drive the steering motor M in such a way as to enforce the constraints. This figure pertains directly to the single wheel (unicycle) constraint device of FIG. 1, which is the simplest constraint device, and is illustrative of the control logic and laws which may be used for higher number of degrees of freedom.

In FIG. 2b, the Cartesian coordinates of the constraint device are read, and compared to the zero crossings of a function C(x, y) which describes the constraints. Depending on the outcome of that comparison, the logic branches into electronic caster mode, or into constraint mode. Readings of the rolling wheel velocity, the steering velocity and position, and the force applied to the handle by the operator are acquired. Motor torque is computed pursuant to the equations given (as elaborated below), and that torque is commanded of the steering motor by passing to it an electrical current proportional to the desired torque.

First, electronic caster mode of the passive constraint device will be discussed. In the case of the single wheel passive constraint device of FIG. 1, it is useful in describing a control scheme to think of the single wheel as a point mass. For a point mass, the acceleration and force vectors are collinear and in fixed proportion. The implication for a single wheel device is that, not only must forces in the wheel direction, $F_{parrallel}$, produce acceleration of $a=F_{parrallel}/M$, but forces normal to the wheel, $F_{perp}$, must similarly produce accelerations of $a=F_{perp}/M$, where M is mass. A very simple kinematic analysis, however, shows that a wheel traveling at a speed U with a steering velocity $\omega$, has an instantaneous normal acceleration of $a=u\omega$.

Thus, a prescription for the steering velocity which would result in particle-like behavior would be given by $$W=F_{perp}/uM \qquad \text{(Equation 1)}.$$

Equation 1 demonstrates that the problem of virtual caster control is fundamentally non-linear: the correct sign of the steering velocity is determined by the product of the signs of $F_{perp}$ and u, which cannot be approximated by a linear relation. It is also learned that, for a given normal force to the shaft SF, the steering velocity scales inversely with the translational velocity. Because of this, there is a singularity at zero speed. At zero speed, it is not physically possible to make the single wheel behave like a particle.

For the single wheel constraint device of FIG. 1, the optical encoder E2 that measures wheel rotation provides data that can be used to derive the wheel rolling speed $\omega_w$, which is simply related to the translational velocity u:

$$u=\omega_w r_w$$

where $r_w$ is the wheel radius. The force sensor (strain gage) FS on the handle shaft SF measures the operator-applied force $f_n$. The computer then calculates $F_{perp}$ as $F_{perp}=f_n\cdot\hat{n}$, where $\hat{n}$ is a unit vector perpendicular to the instantaneous heading of the wheel. Feedback servocontrol can be implemented using a Pentium® computer at a servocontroller update rate of 1 kH. The servocontroller follows the form of Equation 1 above and is modified for torque control and finite sensor resolution.

Due to finite sensor resolution and the singularity at zero translational velocity, the denominator of Equation 1 must also be modified to prevent overflow, excessively large control signals and instability. To this end, the form of the virtual caster controller which can be implemented is:

$$\tau = k_1 \frac{(f_n \cdot \hat{n})}{k_2 \omega_w + \text{sign}(\omega_w)k_k} + k_k \omega$$

where $\tau$ is the torque produced by the steering motor; $k_1$ is an adjustable gain which replaces 1/M in Equation 1; $k_2$ is an adjustable gain; $k_k$ is an adjustable parameter which places a lower limit on the denominator magnitude ($k_k$ is of the same order as the velocity resolution); and k is a gain associated with the steering velocity controller. These gains are adjusted for performance and stability. $\omega_w$ and $\omega$ are estimated by digital differentiation and digital filtering of the associated angular measures.

Measurement of the force $f_n$ by the two axis force sensor on the shaft SF just below the handle S allows measurement of only the operator-applied force. This measure along with a measure of steering angle permits a clean estimate of $F_{perp}$, which is useful in practice of the invention.

Next, constraint mode of the passive constraint device will be discussed. To implement a nonholonomic constraint device of the invention, a surface C(q) is defined in the configuration of space (q) of the device such that, for C(q) greater than 0, the device is outside the virtual wall. Then, it is necessary only to steer the device along the virtual wall whenever C(q) is less than or equal to 0 and $F_{perp}$ points into the virtual wall, and to return to the caster free mode when $F_{perp}$, points away from the virtual wall.

Implementation of servocontrol of the single wheel constraint device of FIG. 1 with respect to virtual wall VW is apparent. When it is determined that the position of the handle S is inside the virtual wall:

$$C(x,y) < 0$$

free mode caster control is replaced by a steering angle controller which aligns the wheel tangent to the wall. One such controller is:

$$\tau = k_{pd}(k_{12}\theta_r + \dot{\theta}_r)$$

where $K_{pd}$ and $k_{12}$ are adjustable gains and $\theta_c$ is the angle between the wheel tangent and the wall tangent. This controller is essentially a steering angle servo controller. However, if a normal force on shaft SF is measured which points out of the wall:

$$f_n \cdot \hat{n} < 0$$

free mode caster control is reinstated.

Figure 3A:
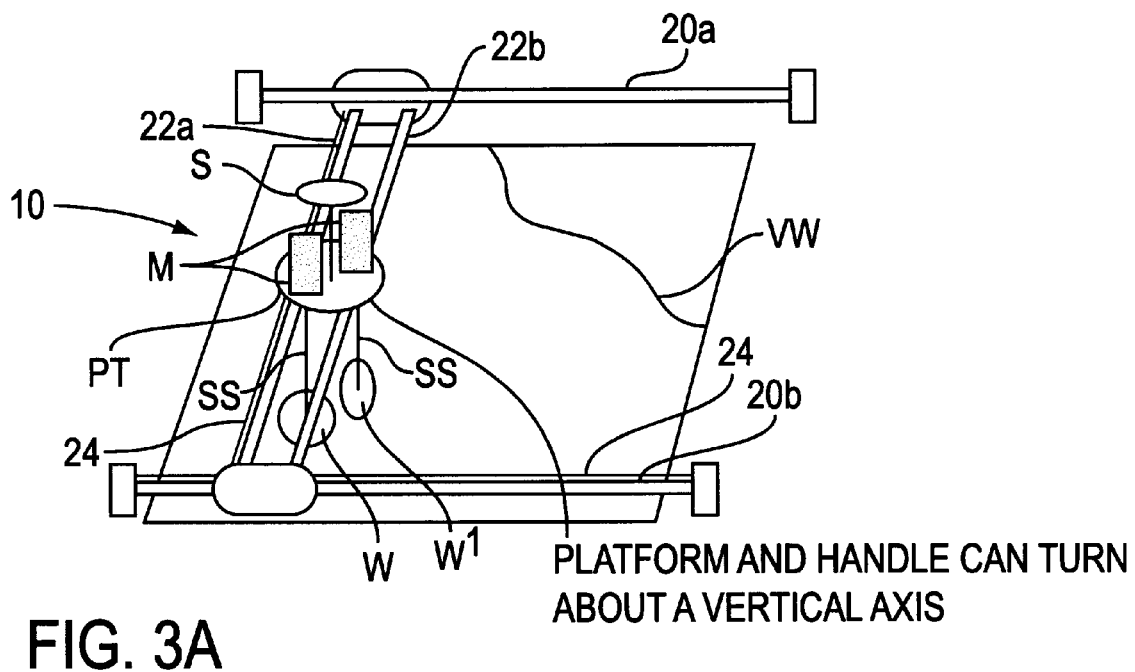
FIG. 3a is a schematic view of a two wheel passive constraint device in accordance with an embodiment of the invention with three (3) degrees of apparent freedom in the free mode and one (1) or two (2) degree of freedom in the constraint mode.
Figure 3B:
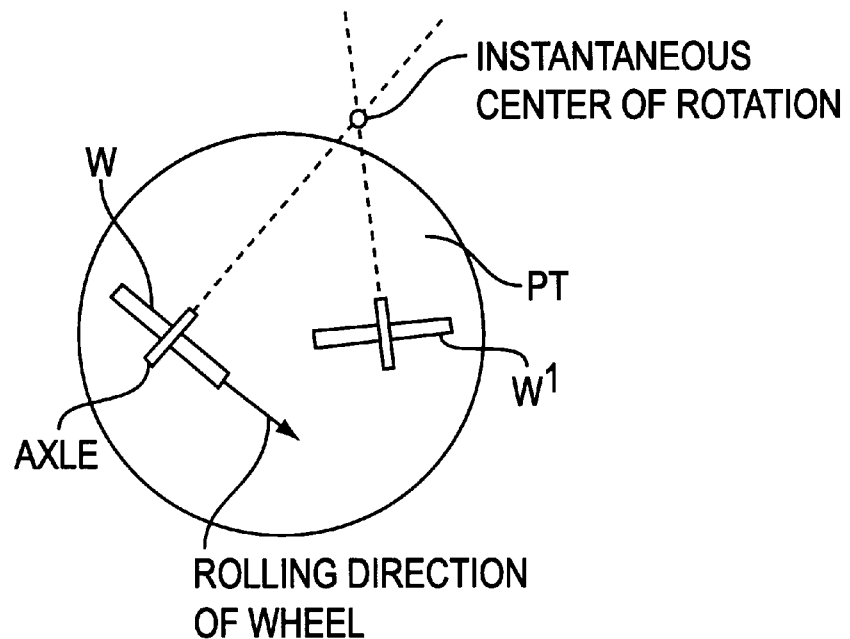
FIG. 3b is plan view of the two wheels.

The constraint device described hereabove can constrain motion in x and y directions; in other words, it is a two degree of freedom device. In many applications angular or rotational orientation of the handle shaft (or wheel) is useful. A two wheel constraint device in accordance with another embodiment of the invention is illustrated schematically in FIGS. 3a and 3b to implement x, y and angular constraint; i.e. 3 degrees of freedom in the free mode, wherein like features are represented by like reference numerals.

The 3 degree of freedom constraint device employs two wheels W, W' spaced a fixed distance apart on the rotatable platform PT shown that can move in the x-y directions. In this embodiment, the platform PT and handle S rotate together about a vertical axis. Use of two wheels W, W' reduces the kinematic freedom of the device to 1. In particular, because of the two rolling constraints, the platform PT can at any moment execute only a single motion, the one which is described by an instantaneous center of rotation at the intersection of the axes of the two wheels W, W'. By steering the wheels W, W' via respective motors M and steering shafts 55 as described above, that instantaneous center can be positioned anywhere in the x-y plane.

By nulling lateral user-applied steering forces on the two wheels independently via the respective motors M and steering shafts SS, three (3) apparent degrees of freedom of motion in the free mode can be provided to the user. By positioning the instantaneous center as a function of the 3-space coordinates of the platform and ignoring lateral forces, motion is restricted to a programmable 1 degree of freedom trajectory through 3-space coordinates. The latter behavior corresponds to contact of a planar rigid body with two frictionless virtual walls simultaneously, leaving 1 degree of freedom in the constrained mode. Between these behaviors lies an intermediate behavior corresponding to contact of a planar body with a 1 degree of freedom virtual wall with 2 degrees of apparent freedom of motion remaining available to the user.

Figure 4:
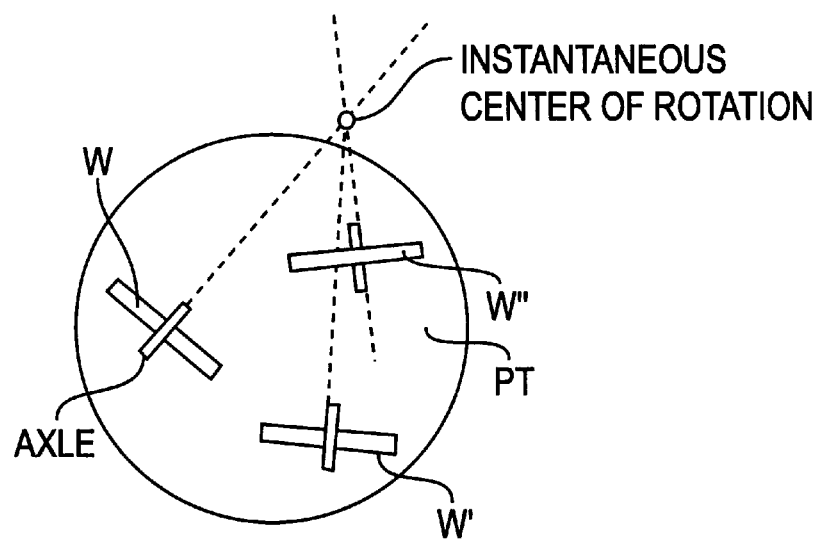
FIG. 4 is a plan view of a three wheel passive constraint device in accordance with an embodiment of the invention with three (3) degrees of apparent freedom in the free mode and zero (0) or one (1) or two (2) degree of freedom in the constraint mode. (Zero degrees of freedom implies no motion is possible.)

Referring to FIG. 4, a third wheel W" can be used as well to provide a 3 degree of freedom device. The third wheel W" is steered by a respective motor and steering shaft (not shown) but like those shown in FIG. 3a. The device of FIG. 4 is similar in behavior in the free mode (3 degrees of freedom) to a three-legged chair with each leg on a caster. The third wheel W" has the practical advantage of allowing the device to stand on its own without the need for the aforementioned Cartesian rails 20a, 20b; 22a, 22b of the previous embodiments.

Furthermore, the third wheel W" allows avoidance of the only singularity that the two wheeled device of FIG. 3 possesses, that singularity occurring when the axes of the two wheels W, W" are collinear. Moreover, the three wheels of FIG. 4 can be intentionally misaligned so that no center of rotation exists, causing the device to become immobile (zero degrees of freedom of motion).

The CVT elements (e.g. wheels) in the above-described embodiments which couple the degrees of freedom of the device serve to transmit power between those degrees of freedom. Communication of power to all degrees of freedom with little loss renders the user's manually supplied steering power to the handle S sufficient to drive the robotic device and also makes possible the passive characteristics of the device.

The embodiments of the invention described hereabove control planar motion in 2 or 3 degrees of apparent freedom in the free mode of operation by coupling the planar degrees of freedom using one or more rolling wheels. The invention also envisions controlling spherical motion; e.g. the three rotations of a sphere about a fixed center.

Figure 5A:
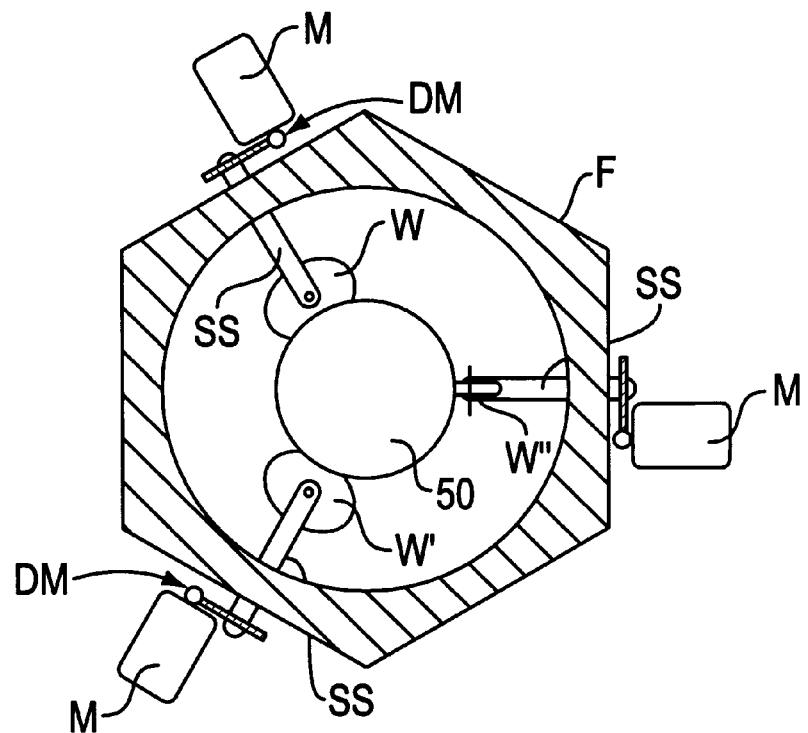
FIGS. 5a and 5b are respective schematic plan and elevational views of a passive constraint device in accordance with an embodiment of the invention with three (3) degrees of apparent freedom in the free mode and zero (0), one (1), or two (2) degrees of freedom in the constraint mode, demonstrating a spherical geometry and workspace in contrast to the planar cartesian geometry and workspace of above figures.
Figure 5B:
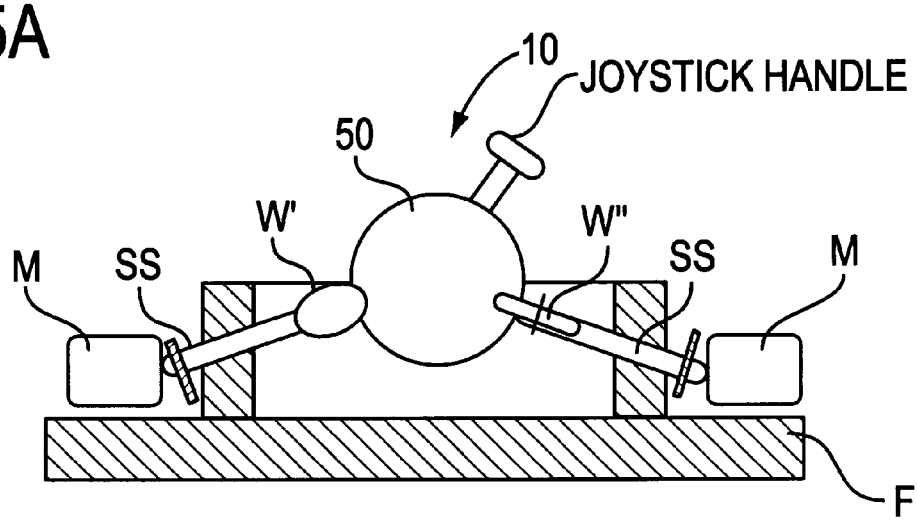

Referring to FIGS. 5a and 5b, a constraint device of the invention is shown to provide a 3-axis user joystick or haptic display. The 3 degrees of freedom of the sphere 50 (to which the joystick handle is attached) are reduced to 1 by the use of the three circular wheels W, W', W" engaging the sphere periphery and steered by respective motors M and rotatable steering shafts SS.

The three rotations of the sphere 50 are the three degrees of freedom of the user joystick. The weight of the sphere creates the normal force at the wheels W, W', W" which prevents slipping. Like the 3 wheel constraint device described hereabove, the three wheel spherical constraint device includes one more wheel than is required to reduce the number of kinematic degrees of freedom to 1.

The three wheels are mounted on a frame F by the respective steering shafts SS, which are rotated about their longitudinal axes by the steering motors M through conventional drive mechanisms DM (as shown), to steer each wheel, with the principles of operation and control being the same as those described hereabove for the single, dual, and three wheel constraint devices.

Figure 6:
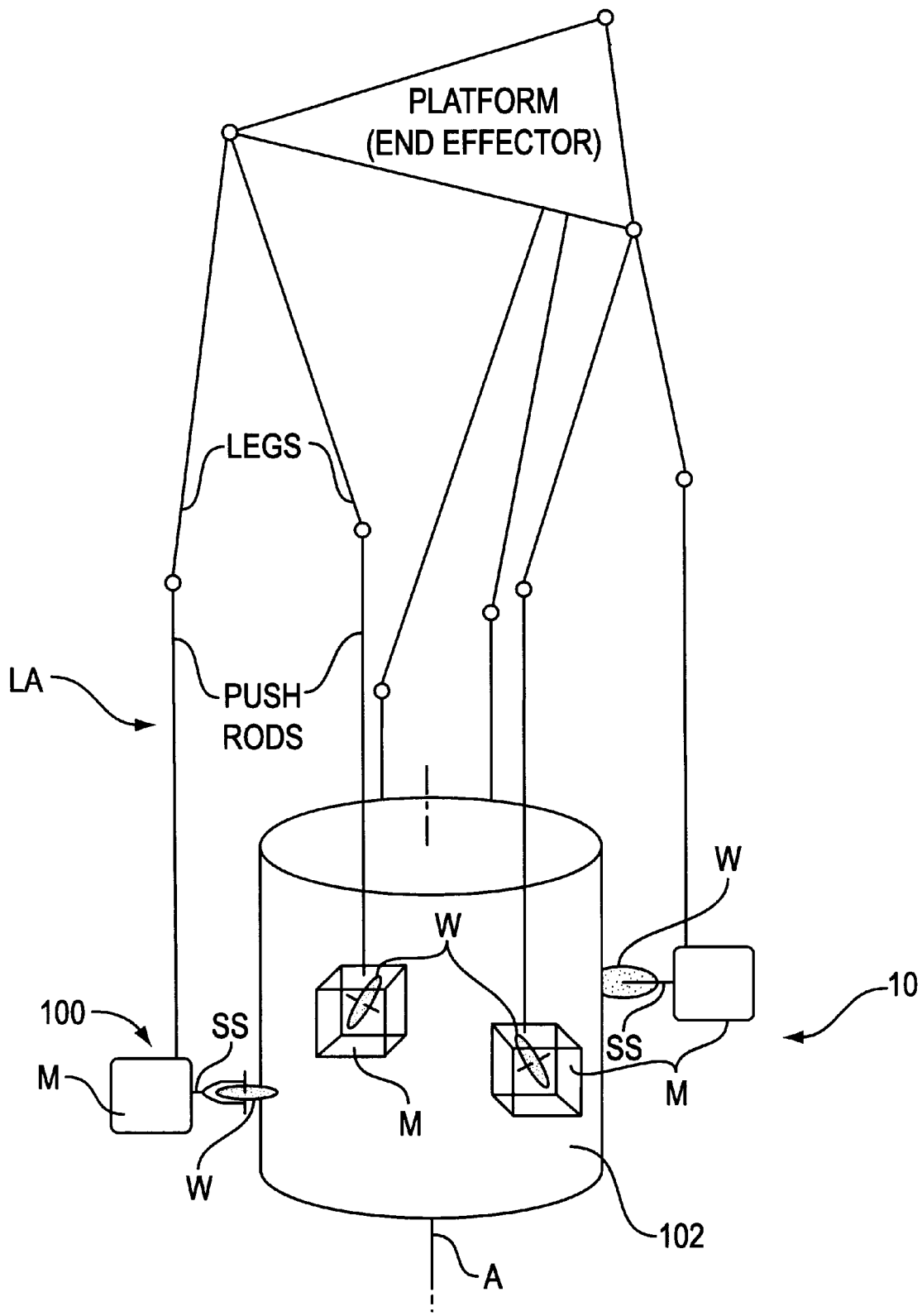
FIG. 6 is a schematic view of a passive constraint device in accordance with an embodiment of the invention with six (6) degrees of apparent freedom in the free mode and from zero (0) to five (5) degrees of freedom in the constraint mode, demonstrating a parallel geometry which achieves the full six degrees of freedom of general purpose manipulation.

The invention also envisions controlling up to six degree of freedom motion, such as is needed for general purpose manipulation of rigid bodies in space, as by a robotic manipulator. Such manipulators may be of either a parallel or serial robotic architecture, or a hybrid, and may involve either prismatic or revolute joints, or both. FIG. 6 demonstrates a parallel prismatic embodiment, while FIG. 9 described here below demonstrates a serial revolute embodiment.

Referring to FIG. 6, a constraint device is shown to provide a six axis manipulator in the parallel architecture commonly known as the Stewart platform configuration. In it, each of the six linear actuators LA (comprising the legs shown and push rods shown) that control the motion of the platform, or end-effector, is coupled via a rolling wheel transmission device 100 to a single cylinder 102 which is free to rotate about its longitudinal axis on bearings (not shown). The platform or end-effector is connected to a user manipulator, such as a handle, joystick or the like to constrain the user's movement thereof pursuant to a virtual wall or surface. Each transmission device 100 comprises a steering motor M and rotatable steering shaft SS to control the steering angle alpha of each transmission wheel W as described above, and thus the transmission ratio coupling each leg to the common motion of the central cylinder 102. The push rods shown are connected to respective transmission devices 100 to this end as shown.

FIG. 6 depicts a constraint device appropriate to driving a 6 degree of freedom manipulator of parallel architecture. The manipulator shown is described in more detail in System for Positioning a Medical Instrument Using a Micromanipulator, J. E. Colgate, M. R. Glucksberg, and K. W. Grace, U.S. Pat. No. 5,410,638 issued Apr. 25, 1995, the teachings of which are incorporated herein by reference. It consists of a triangular platform which is maneuverable in 6-space, as driven by legs and pushrods as shown, coupled to each other and to the platform by spherical joints. Details of the platform, legs, and pushrods are not shown in FIG. 6 for purposes of clarity to illustrate the way in which the existing conventionally actuated robot design can be converted to a constraint device by replacement of its actuators with steered wheels pursuant to the invention. Such details can be found in the aforementioned '638 patent incorporated herein by reference. The steering motors control the steering angle of each of the six rolling wheels, which are constrained by linear bearings (not shown for clarity of illustration) to move only vertically, parallel to the longitudinal axis of the central cylinder.

In the embodiments of the invention described hereabove, the wheel(s) W, W', W" constitutes a continuously variable transmission (CVT) element which couples two translational velocities by a ratio which is adjustable. Referring to FIG. 1, the wheel W couples translational velocities of its center, vx and vy, with vy/vx equal to an adjustable transmission ratio which is the tangent of the rolling direction (or steering angle) alpha, with respect to the x axis. By controlling the steering angle alpha, the transmission ratio relating vx and vy continuously through the entire range of negative infinity to positive infinity. The wheel W thus allows a full range of transmission ratios of both positive and negative signs.

Considering the rolling wheel above to be a CVT element for translational motion, an analogous element for rotational motion should also exist. Indeed, continuously variable transmissions for rotational motion are well known. Most of these have a relatively narrow range of transmission ratios through which they may be adjusted, typically a factor three from greatest to least transmission ratio. Some prior CVT's also permit a change of sign (reversal of direction).

For use in the passive constraint device of the invention, a very broad range of transmission ratios is required, ideally from positive infinity, through zero, to negative infinity. In practice infinity is not attainable to a rotational CVT, just as it is not available to the wheel.

Prior OVT's have involved cone and disk based CVTs as well as sphere based CVT's. Sphere-based CVT's have been proposed as integrators (U.S. Pat. No. 1,256,234), as navigational devices (U.S. Pat. No. 572,832), as fire control devices (U.S. Pat. No. 2,139,635), as mechanical resolvers or computers (U.S. Pat. Nos. 2,477,527 and 2,586,421), and as a transmission for a motor vehicle (U.S. Pat. No. 2,727, 396).

A CVT element of the invention is explained below in two steps: first, a conceptually simpler but mechanically more difficult element, followed by a conceptually more difficult but mechanically perferable embodiment. The CVT element of the invention differs kinematically from the transmission element of the U.S. Pat. No. 2,727,396 in having two orthogonal, not collinear, drive axes. Morever, the CVT element of the invention has oppositely curved rolling contacts, and indeed the rollers are sections of spheres rather than cylinder in order to minimize the area of contact. This contrasts to the bevel contact between a drive roller and sphere of U.S. Pat. No. 2,727,396 with the rolling surfaces in contact having the same sign of curvature, such that the area of contact is as great as possible (i.e. the sphere rolls inside the driving roller), thereby contributing to wear and adding to the frictional losses which limit the maximum attainable transmission ratio.

Figure 7:
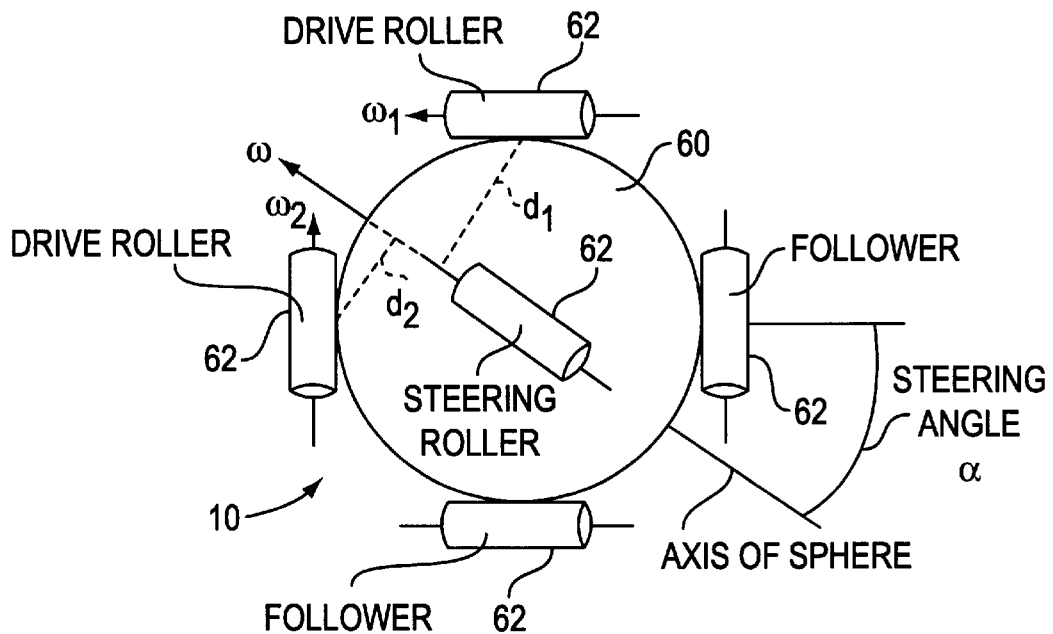
FIG. 7 is a schematic view of a continuously variable transmission kinematic mechanism, which serves the purpose of coupling two rotational velocities of motion, analogously to the coupling of two translational velocities of motion accomplished by a rolling wheel.

Referring to FIG. 7, a rotational CVT passive constraint device in accordance with the invention is illustrated as comprising a sphere 60 confined by six rollers 62 with the rollers arranged as if on faces of a cube surrounding the sphere 60. Each of the six rollers 62 is biased toward the center of the sphere 60 by an externally applied spring force $F_{parrallel}$ The force serves to keep each of the rollers 62 in rolling contact with the sphere 60. For purposes of illustration, the frame which holds the rollers, the bearings which allow the rollers to rotate, and the springs which supply the force $F_{preload}$ are not shown.

Two of the rollers are designated as drive rollers in FIG. 7. These are the rollers that interface with parts of a device that incorporate the CVT spherical element These drive rollers have angular velocities $W_1$ and $W_2$. Two other rollers diametrically opposite the drive rollers are designated as follower rollers. They serve only to confine the sphere 60 and to apply the force $F_{preload}$. They rotate with angular velocities $W_1$ and $W_2$ also but this rotation is not considered. The aforementioned four rollers (two drive rollers and two follower rollers) have axes of rotation that all lie in a single plane that passes through the center of the sphere 60.

The remaining two rollers located at the top and bottom of he sphere 60 are designated steering rollers in FIG. 7 (only the top steering roller being shown as the bottom steering roller is hidden from view. It is oriented identically to the top steering roller). Unlike the drive rollers and the follower rollers, the rotational axis of each steering roller is adjustable. The angle that the axis of each steering roller forms with the horizontal is designated the steering angle alpha. The axes of the two steering rollers is coordinated by a gear linkage or other suitable mechanism which keeps the axes of the two rollers in a common plane. The steering angle may be adjusted by a steering motor in the manner described above for the rolling wheel.

In operation of the rotational CVT, the preload force $F_{preload}$ and the coefficient of friction between the sphere 60 and rollers 62 are maintained at levels to prevent sliding between the sphere and rollers and instead provide rolling contact therebetween.

The kinematics of the rotational CVT passive constraint device can be explained by considering all possible axes of rotation of the sphere 60. The sphere 60 must be in rolling contact with all six rollers 62. Since the center of the sphere 60 is stationary, the sphere's axis of rotation must pass through its center. Rolling contact with a given roller 62 requires that the axis of the sphere 60 lies in a plane defined by the axis of the roller 62 and the center of the sphere. Each roller 62 forms such a plane, although the planes of the follower rollers and the bottom steering roller can be ignored due to symmetry.

The axis of rotation of the sphere 60 must be the intersection of the three planes demanded by the two drive rollers and one steering roller. Such an axis exists in the plane of the figure passing through the center of the sphere 60 and parallel to the axis of the steering roller. Considering the velocities of the points of contact between the drive rollers and the sphere 60, if the radius of the drive rollers is $R_{roller}$, the velocities of these points of contact are $W R_{1\ roller}$ and $-W R_{2\ roller}$ perpendicular to the plane of the figure. If the angular velocity of the sphere 60 (about its axis identified above) is W, and the distances from that axis to the points of contact are $d_1$ and $d_2$, then the velocity of the points of contact can also be computed as $Wd_1$ and $Wd_2$. Equating $W_1 Rroller=Wd_1$ and $-W_2 R_{roller}=-Wd_2$, it is determined that $W_2/W_1=d_2/d_1$. From geometry, $d_2/d_1=\tan$ alpha. Thus, the adjustable transmission ratio between the angular velocities of the two drive rollers is $W_2/W_1=\tan$ alpha where alpha can be interpreted as the steering angle in the same manner as for the single wheel constraint device described hereabove.

Figure 8:
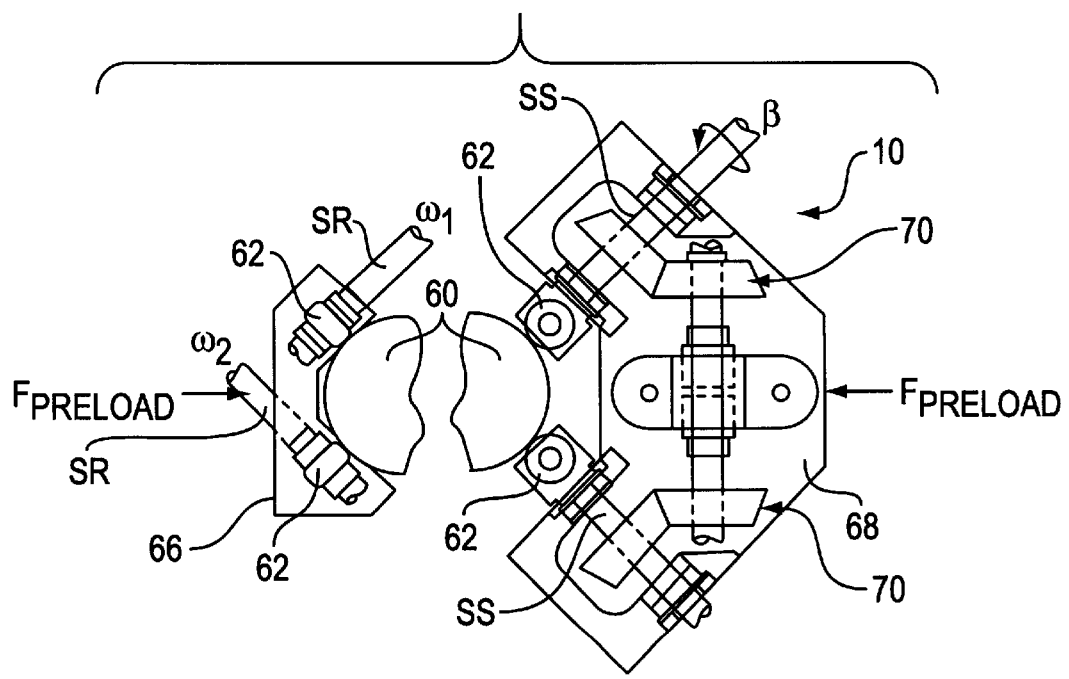
FIG. 8 is a schematic view of a continuously variable transmission kinematic mechanism, with a modified geometry relative to that of FIG. 7, but the same function.

FIG. 8 illustrates a modified rotational CVT passive constraint device which has the same principle of operation as the constraint device of FIG. 7. However, the constraint device of FIG. 8 requires only four rollers 62, four rollers being the minimum number needed to confine a sphere (shown broken apart for convenience of illustrating other components cooperating therewith). The two follower rollers of FIG. 7 are eliminated in the embodiment of FIG. 8.

The rollers 62 contact the sphere 60 at four points describing the corners of a tetrahedron. To facilitate machining and fabrication, this tetrahedron is not a regular tetrahedron, but rather a stretched tetrahedron such that the angle subtended by the points of contact of each pair of rollers with the center of the sphere 60 is 90 degrees (as opposed to the angle of 108 degrees for a regular tetrahedron).

The rollers 62 no longer need to be independently preloaded in this embodiment. Instead, a rigid frame 66 holds the two drive rollers and another rigid frame 68 holds the steering rollers as shown. These two frames can be simply drawn together by a spring (not shown) which will apply the same force $F_{preload}$ to all four contact points between the sphere and rollers.

FIG. 8 shows a bevel gear mechanism 70 which causes the two steering rollers to stay aligned. The axes of the two steering rollers on frame 68 are rotated in opposite directions by this gear mechanism such that one steering roller turns clockwise and the other steering roller turns counterclockwise.

The axes of the rotatable drive shafts SR of the drive rollers on frame 66 are perpendicular and coplanar as in the cubic arrangement of rollers 62 described for FIG. 7. The rotational axes of the two steering rollers 62 are not parallel as they were in the cubic arrangement of FIG. 7, however. They are in fact coplanar but the plane that they share does not in general contain the center of the sphere 60. Rather, the two distinct planes formed by the rotational axis of each steering roller with the center of the sphere 60 intersect one another and that line of intersection is the axis of the rotation of the sphere 60. It lies in the plane of the drive rollers.

Geometry yields the transmission ratio as $W_2/W:=(-\cos 45 \cot beta-1)/(-\cos 45 \cot beta+1)$ where beta is the angle to which the axes of the steering rollers have been turned relative to the configuration shown in FIG. 8. This transmission ratio assumes a full range of values (negative infinity through positive infinity) as the steering angle beta is adjusted in the manner described above.

The rotational CVT is the principle component of revolute joints occurring in constraint machines envisaged in this invention, just as the rolling wheel is the principle component of prismatic joints occurring in the constraint machines described hereabove of the invention.

Figure 9:
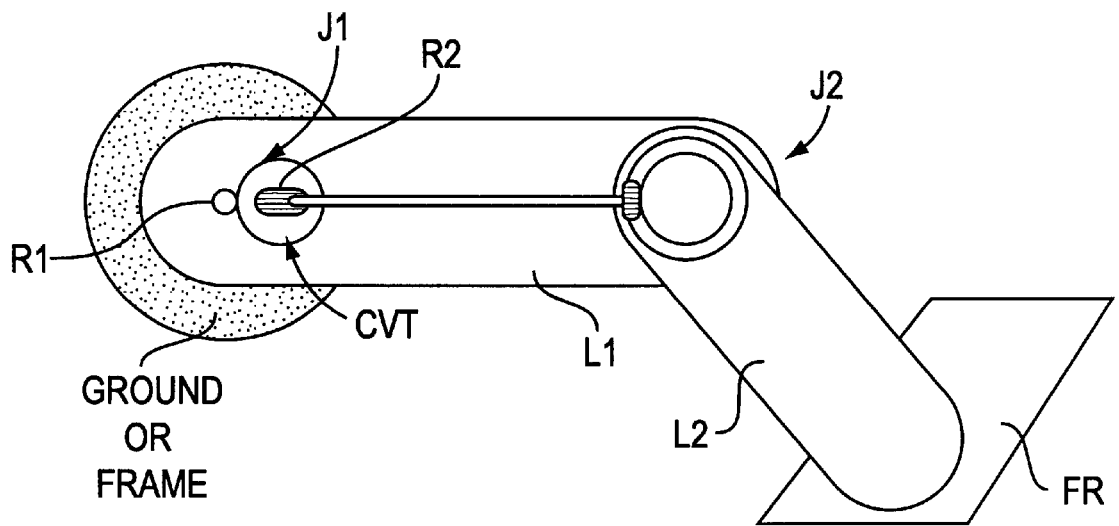
FIG. 9 is a schematic view of a passive constraint device in the form of a two-link serial robot, showing how the continuously variable transmission kinematic mechanism of the invention can be used in serial robot configurations. Additional serial links can be added, each requiring an additional continuously variable transmission kinematic mechanism.

FIG. 9 shows a two-link serial embodiment of a constraint device, which uses a single rotational CVT to couple its two revolute joints. The constraint device can be extended to a greater number of serial revolute joints, by coupling each consecutive pair with a rotational CVT as illustrated. In FIG. 9, a single CVT couples the angular velocity of joint J1 at the frame or ground shown to the angular velocity of joint J2 between links L1, L2. (Note that the angular velocity of a joint is the difference in angular velocities of the two links that it joins). For clarity in illustration, the steering rollers and support structure of the CVT are not shown. Both drive rollers R1, R2 are shown, the first roller being directly driven by the angular velocity of joint J1 and the second roller communicating via the rod and the bevel gear shown with the angular velocity of joint J2. A flange FR or other attachment at the end of the link L2 is connected to a user manipulator such as a handle, joystick, or the like to constrain user's movement thereof pursuant to a virtual wall or surface.

Although the invention has been shown and described with respect to certain embodiments thereof, it should be understood by those skilled in the art that other various changes and omissions in the form and detail thereof may be made therein without departing from the spirit and scope of the invention as set forth in the appended claims.

We claim:

1. A passive constraint device having at least two directional velocities of motion for use in implementing a programmable virtual constraint surface, comprising:

non-holonomic kinematic transmission element means for coupling directional velocities of motion of said passive constraint device, said non-holonomic kinematic transmission element having a steering angle for controlling a ratio of said directional velocities of motion;

means for controlling the steering angle of said non-holonomic kinematic transmission element means in order to adjust the ratio of said directional velocities of motion;

means for allowing a user to manipulate the device relative to a virtual surface;

motor means for setting a steering angle of the transmission element means and;

means for controlling the steering angle of said non-holonomic kinematic transmission element means to prohibit any motion of the passive constraint device which would penetrate the virtual surface when the device is in contact with the virtual surface, and for adjusting the steering angle in response to forces applied by the user when the device is remote from the virtual surface so as to provide to the user an apparent increased number of degrees of freedom of motion of the device.

2. The device of claim 1 wherein said means for controlling comprises feedback servocontroller means for controlling said motor means, said servocontroller means having as inputs force perpendicular to the direction of motion allowed by the transmission element means, velocity of motion tangential to the direction of motion allowed by the transmission element means, and also the present coordinates describing the configuration of the constraint device, present steering angle, and also rate of change of the steering angle, and having as output electrical current to said motor means.

3. The device of claim 1 wherein the non-holonomic kinematic transmission element means comprises a wheel which couples translational velocities of motion.

4. The device of claim 3 wherein the wheel travels relative to x-y rails and the wheel couples the velocities in the x direction and y direction.

5. The device of claim 3 wherein the wheels travel on the surface of a cylinder.

6. The device of claim 1 wherein the non-holonomic kinematic transmission element means comprises two wheels which couple translational velocities of motion.

7. The device of claim 6 wherein the wheels travel relative to x-y rails.

8. The device of claim 6 wherein the non-holonomic kinematic transmission element means comprises three wheels which couple translational velocities of motion.

9. The device of claim 8 wherein the wheels travel on a planar surface.

10. The device of claim 8 wherein the wheels contact a sphere.

11. The device of claim 1 wherein the non-holonomic kinematic transmission element means comprises a spherical transmission element confined in contact with six rollers in a cubic arrangement, and which couples rotational velocities of motion of two of the rollers in a ratio set by the steering angle of two other rollers.

12. The device of claim 1 wherein the non-holonomic kinematic transmission element means comprises a spherical transmission element confined in contact with four rollers in a tetrahedral arrangement, and which couples rotational velocities of motion of two of the rollers in a ratio set by the steering angle of the other two rollers.

13. The device of claim 1 wherein said means by which a user can manipulate the device relative to the virtual surface comprises a non-rotatable handle disposed on a platform on which said transmission element means is disposed and driven to rotate by a rotatable steering shaft connected to said motor means.

14. The device of claim 1 wherein said means by which a user can manipulate the device relative to the virtual surface comprises a handle disposed on a platform on which a plurality of said transmission element means are disposed and rotated by respective rotatable steering shafts connected to respective motor means, said handle and platform being rotatable about an axis.

15. The device of claim 14 wherein the element couples the angular velocities of two joints of a two link serial revolute robot, manipulator, or haptic display.

16. The device of claim 14 wherein several elements couple the angular velocities of pairs of joints of a multiple link serial revolute robot, manipulator, or haptic display.

17. The device of claim 1 in which six wheels travel on the surface of a freely rotating cylinder, and in which the wheels couple the translational velocities of six linear stages aligned coaxially with the cylinder, and in which each of the linear stages is coupled via a fixed-length leg to a common platform.

18. The device of claim 1 wherein steering of said transmission element means is supplemented by natural steering of an offset caster.

19. An apparatus comprising:

at least one steerable non-holonomic transmission element which couples two or more directional velocities of motion via a steering angle;

a motor for adjusting the steering angle of the at least one non-holonomic transmission element;

a memory which stores a description of a virtual surface; and a computer for controlling the steering angle of said at least one non-holonomic kinematic transmission element in order to prohibit any motion of the passive constraint device which would penetrate the virtual surface.

20. An apparatus as claimed in claim 19, wherein said computer also controls the steering angle of said at least one non-holonomic kinematic transmission element in response to forces applied by the user when the device is remote from the virtual surface so as to provide to the user an apparent increased number of degrees of freedom of motion of the device when said device is remote from said virtual surface.

21. The device of claim 19, wherein said non-holonomic kinematic transmission element couples translational velocities of motion.

22. The device of claim 19, wherein said non-holonomic kinematic transmission element couples angular velocities of motion.

23. A method for controlling a robotic device having a plurality of joints coupled together by at least one steerable non-holonomic transmission element, comprising:

storing a virtual surface;

determining the position and speed of the robotic device;

measuring the force applied by an operator to the robotic device;

adjusting a steering angle of said non-holonomic transmission element so as to prohibit any motion of the robotic device that would penetrate said virtual surface when said robotic device is in contact with said virtual surface; and adjusting a steering angle of said non-holonomic transmission element so as to provide apparent freedom of motion to a user when said robotic device is not in contact with said virtual surface.

24. A method for controlling a robotic device having a plurality of joints coupled together by at least one steerable non-holonomic transmission element, comprising:

storing a path to be followed by the robotic device;

determining the position and speed of the robotic device;

measuring the force applied by an operator to the robotic device;

continuously adjusting the steering angle of said non-holonomic transmission element as said robotic device is moved along said path by an operator so that the robotic device will move smoothly along said path.

25. An apparatus comprising:

an endpoint movable by an operator in a plurality of directions;

at least one non-holonomic transmission element which couples a velocity of said endpoint in one of said directions with a velocity of said endpoint in another of said directions, said nonholonomic kinematic transmission element having a steering angle which controls a ratio of said velocities, whereby mechanically allowed directions of motion of said endpoint are dictated by the steering angle of said at least one non-holonomic transmission element; and a computer, connected to said motor and said at least one non-holonomic transmission element, which controls the mechanically allowed directions of motion through space of the endpoint by adjusting the steering angle of said at least one non-holonomic kinematic transmission element.

* * * * *